Sept. 29, 1959  H. S. MORTON, JR  2,906,858
LIQUID VORTEX ARC TORCH PROCESS
Filed Oct. 10, 1957  2 Sheets-Sheet 2

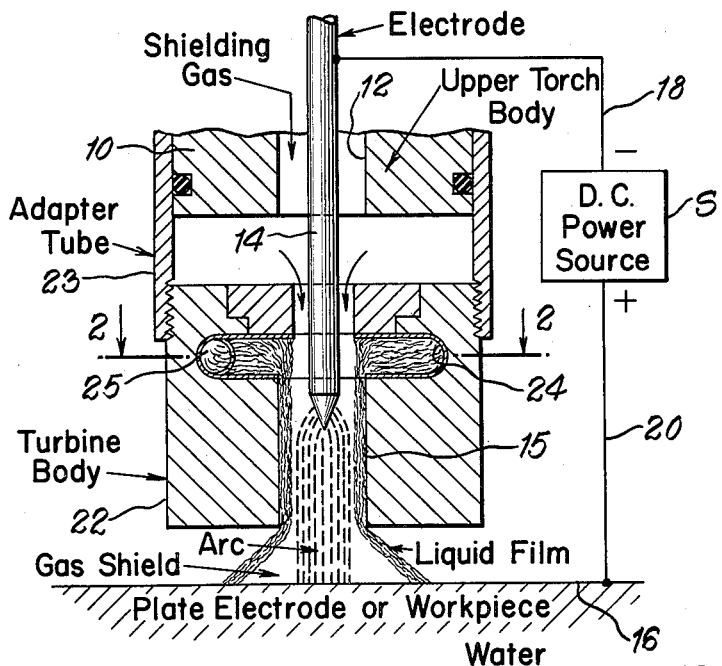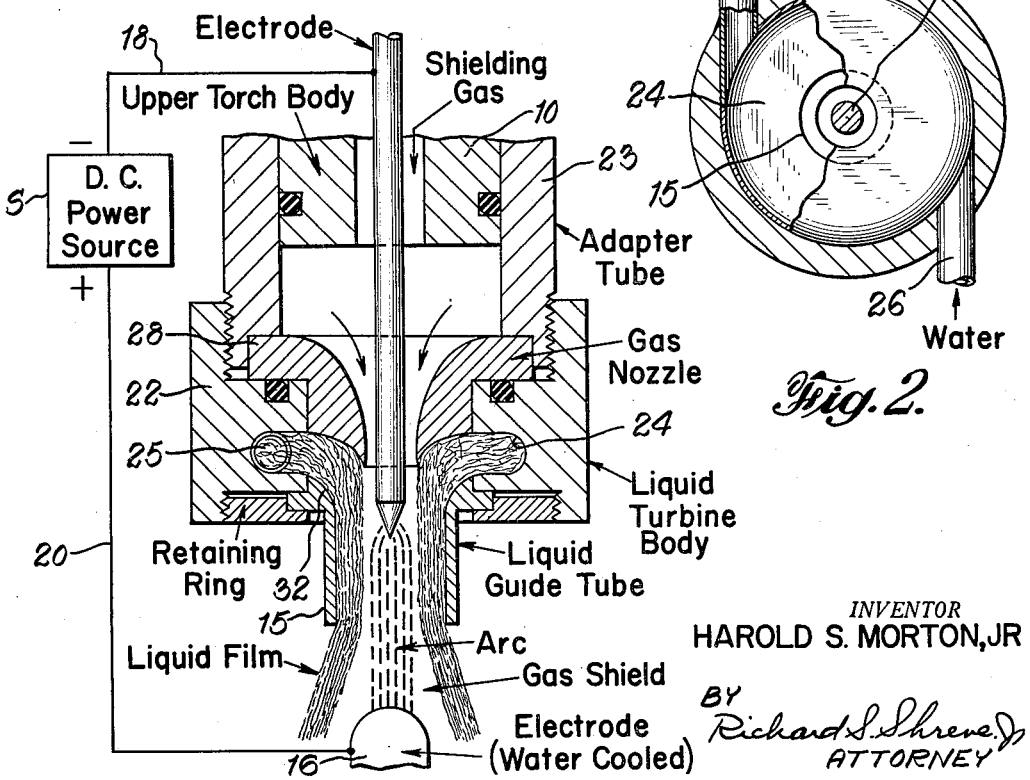

INVENTOR.
HAROLD S. MORTON, JR.
BY
Richard S. Shreve
ATTORNEY

United States Patent Office 2,906,858
Patented Sept. 29, 1959

2,906,858
LIQUID VORTEX ARC TORCH PROCESS

Harold S. Morton, Jr., Oak Ridge, Tenn., assignor to Union Carbide Corporation, a corporation of New York Application October 10, 1957, Serial No. 689,370

7 Claims. (Cl. 219—121)

This invention relates to a liquid vortex stabilized arc torch process, and constitutes an improvement on the processes disclosed in the copending patents of R. M. Gage, No. 2,806,124 and No. 2,858,411.

In prior arc torch processes of the type disclosed and claimed in the above patents, the constricting and/or stabilizing nozzle walls were internally water-cooled. No liquid passed through the torch orifice; the coolant did not come in contact wtih the shielding gas or with the arc plasma.

Water-turbine arcs have also been known in the prior art, wherein an arc is struck through the center of a water vortex between two consumable carbon electrodes. These processes have been impracticable commercially, due to extremely short electrode life (of the order of seconds or perhaps a minute). Since rates of loss of carbon from the electrodes were high, these processes and apparatus were unsatisfactory; relatively complex control mechanisms were required to compensate for arc parameter variations which would otherwise occur during operation.

The objects of the present invention are, therefore, to eliminate double-arcing during transferred arc operation, to provide a means for increasing arc constriction, to provide a device for conveniently treating a liquid (by bringing the liquid into close proximity to the constricted arc), and at the same time to control or eliminate deterioration of torch components. A primary result is a torch whose structure is essentially non-consumable, and which consequently has a long life and does not in itself contribute unwanted materials to the effluent.

According to the present invention, water (or some other liquid) in the form of a liquid vortex surrounds the arc so as to form a cool wall for arc constriction and stabilization; the wall is self-renewable and comparatively nonconductive. In particular, the stabilized arc passes down through the center of the liquid vortex. A separate stream of shielding gas passes down around an inner electrode to protect it from contamination and deterioration.

In the drawings:

Figure 1 is a diagrammatic vertical section through apparatus for carrying out the process according to an early embodiment of the present invention;

Figure 2 is a horizontal section taken in a plane indicated by the line 2—2 of Figure 1;

Figure 3 is a view similar to that in Figure 1 and shows a preferred embodiment of the present invention;

Figure 4:
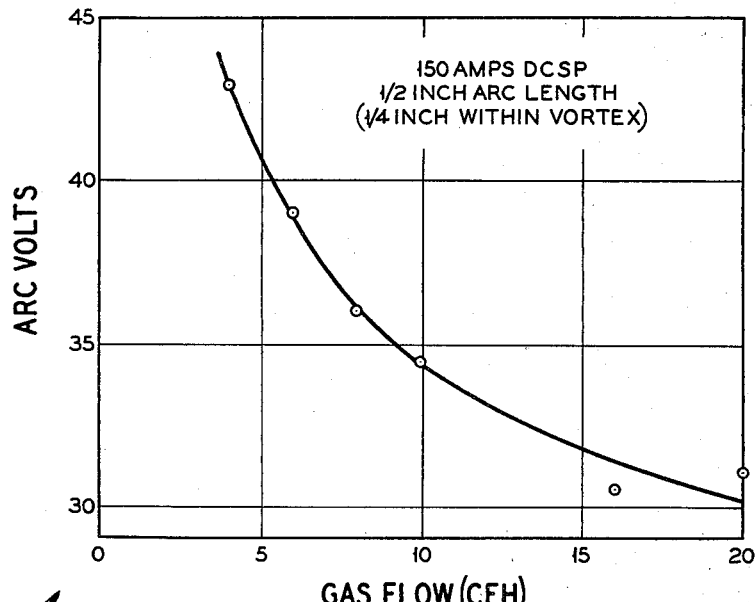
Figure 4 is a typical curve which shows how the arc voltage varies as a function of the gas flow.

As shown in the drawings, the arc torch has an upper torch body (indicated generally at 10); an electrode 14 is situated axially within a cylindrical hole 12 bored in the upper torch body. The wall of the hole 12 and the electrode 14 provide therebetween an annular passage for the flow of a suitable gas, such as helium, hydrogen, argon, nitrogen, or mixtures thereof, or any other gas compatible with the electrode, torch and work materials, and with the desired method of operation. This gas flows axially in an annular stream around the primary electrode 14. An elongated liquid vortex, in the form of a thin cylindrical sheet supported by guide tube 15, is aligned coaxially with the electrode. The other primary electrode may be a metal workpiece or a water-cooled electrode 16. An arc is caused to operate in the passage within liquid guide tube 15 and between the electrode 14 and the workpiece 16 when a suitable source of current S is connected thereto by leads 18 and 20. An extremely hot electrically-conductive effluent issues from the outlet of the passage within liquid guide tube 15. Some portion of the total effluent may consist of vapor from the liquid film. The pressure within the vortex, and hence the pressure at which the arc operates, can of course be varied over a wide range.

In the form shown in Figures 1 and 2, the liquid guide tube 15 is integral with the turbine body 22, which is connected with the upper torch body 10 through an adapter tube 23. Formed in the body 22 is an annular chamber 24, into which liquid under pressure is tangentially injected through inlets 25 and 26 and then caused to whirl or spiral down along the guide tube 15, forming a liquid film or layer leaving the guide tube and surrounding the central effluent issuing from the guide tube. This design works reasonably well; however, the liquid has a tendency to back up above chamber 24, thus contaminating the electrode and contributing to undesirably short electrode life. Control over arc parameters, such as length, voltage, and current, even though greatly superior to that attainable with prior devices, is nonetheless somewhat erratic.

In the form shown in Figure 3, a gas nozzle 28 is mounted ahead of the turbine body 22 and a similar nozzle throat 32 is provided in the turbine body itself in order to streamline the gas and water flows and thereby improve the operation. A model built to this design operated at current levels of hundreds of amperes for hours at a time with no adjustments required.

In both forms the film or layer of liquid with the stream of arc-gas plasma forms the total effluent issuing from the guide tube 15. The following examples describe the operation of the liquid vortex stabilized arc torch process:

*Example I.—Liquid vortex arc torch process*

The torch shown in Figure 1 was used for this run. Water, flowing at a rate of approximately 1½ g.p.m., tangentially entered the annular turbine chamber (³⁄₁₆-inch high and 11⁄16-inch diameter) and then passed with a spiral or helical motion down along the wall of the ⁵⁄₁₆-inch diameter guide tube, which was ½-inch long. Argon gas was passed at a rate of 20 c.f.h. down around a ⅛-inch diameter thoriated tungsten electrode and out through the center of the water vortex. An arc of 150 amperes and 60 volts (D.C.S.P.) was maintained between the inner electrode and a water-cooled anode. The pressure was approximately atmospheric.

The torch construction was then modified to that shown in Figure 3 in order to streamline the gas and water flows and to improve the operation. The following example describes the operation of this preferred model:

*Example II.—Liquid vortex arc torch process*

Water (at a rate of approximately 1½ g.p.m.) tangentially entered the annular chamber and spiralled in a thin film or sheet down along the guide tube. Argon gas (at a rate of 10 c.f.h.) passed through the torch while an arc of 50 amperes and 37 volts (D.C.S.P.) was maintained between the inner electrode and a water-cooled copper anode. This apparatus could be operated for several hours in an essentially non-consumable manner.

Figure 5:
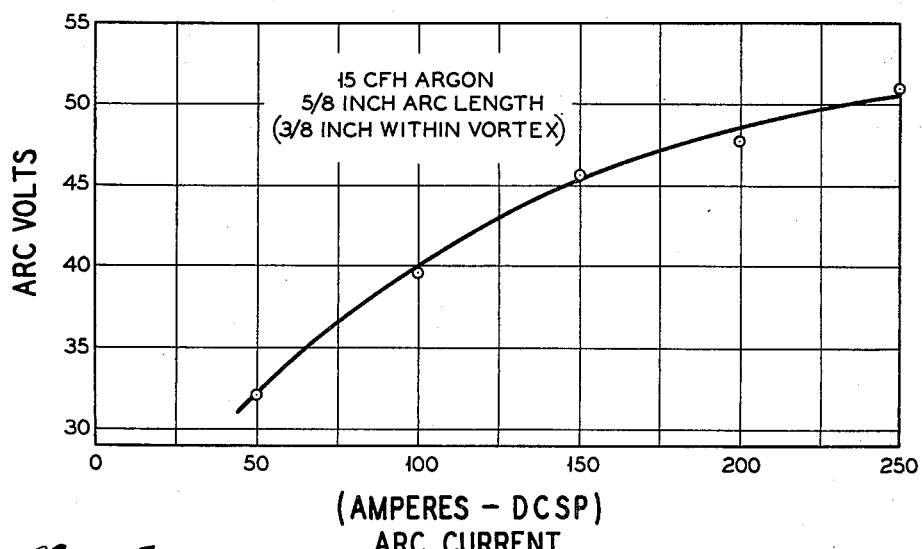
Figure 5 is a typical curve which shows how the arc voltage varies with arc current.

A liquid vortex stabilized arc of this type has wide utility. A liquid can be exposed to the arc during passage down along the walls of the torch orifice; chemical reactions may be induced as a result of the close proximity of the liquid to the hot arc plasma, reactions either within the liquid itself or between the liquid and the shielding gas. When this arc is used as a chemical tool, the concentration of reactant vapor in the arc column (i.e., vapor from the liquid film) can be varied both by adjusting the rate of flow of the shielding gas past the torch electrode and by adjusting the current. This is shown by Figures 4 and 5, where water was used as the liquid, but other liquids could be used as well. It is well known that water vapor arcs characteristically operate at much higher voltages than similar arcs in argon. The decrease in arc voltage (shown in Figure 4 as a function of gas flow) is indicative of the lower concentrations of water vapor in the arc plasma as the argon gas flow rate is increased. Spectroscopic studies were made of the radiation emitted by the plasma, as observed through a quartz guide tube. The importance of this control of vapor concentration can be emphasized by considering that a reactant gas, such as hydrogen, and a reactant liquid or mixture of liquids, such as hydrocarbons, can be used in this torch; control over their relative concentrations at the fringes of the plasma provides a means of controlling the reactions which occur.

The rapid increase in arc voltage with current (as shown in Figure 5) indicates that higher vapor concentrations exist in the arc plasma as a direct consequence of the increased rate of energy transfer from the arc column to the liquid. This again constitutes a separate control over vapor concentration and thus over reaction conditions.

Electric arcs are well known to be strong sources of ultraviolet radiation energy. The present novel process and apparatus provide what appears to be an ultimate in controlled exposure of a liquid to ultraviolet radiation when the liquid is passed down the guide tube as a thin vortex film. The thickness of the liquid film and the current are easily controlled, so that optimum treatment can be obtained.

What is claimed is:

1. Process which comprises establishing a high-pressure high-current arc between a non-consumable inner electrode and another electrode, passing an annular stream of suitable gas along said non-consumable electrode to shield the same and form part of the arc-gas effluent, maintaining a liquid vortex surrounding the arc to constrict and stabilize the same and to control and direct said effluent between the point of such stabilization and said other electrode, the stabilized arc and shielding gas passing down through the center of said liquid vortex, said liquid vortex extending beyond the point of stabilization and becoming a part of said effluent.

2. Process which comprises establishing a high-pressure high-current arc between a non-consumable inner electrode and another electrode, passing an annular stream of suitable gas along said non-consumable electrode to shield the same and form part of the arc-gas effluent, maintaining a liquid vortex surrounding the arc to constrict and stabilize the same and to control and direct said effluent between the point of such stabilization and said other electrode, the stablized arc and shielding gas passing down through a converging zone into the center of said liquid vortex, said liquid vortex extending beyond the point of stabilization and becoming a part of said effluent.

3. Apparatus which comprises means for establishing a high-pressure high-current arc between a non-consumable inner electrode and another electrode, means for passing an annular stream of suitable gas along said non-consumable electrode to shield the same and form part of the arc effluent, means for maintaining a liquid vortex surrounding the arc to constrict and stabilize the same and to control and direct said effluent between the point of such stabilization and said other electrode, the stabilized arc and shielding gas passing down through the center of said liquid vortex, said liquid vortex extending beyond the point of stabilization and becoming a part of said effluent.

4. Apparatus which comprises means for establishing a high-pressure high-current arc between a non-consumable electrode and another electrode, means comprising a gas nozzle having a streamlined interior for passing an annular stream of suitable gas along said non-consumable electrode to shield the same and form part of the arc effluent means comprising a liquid nozzle having a streamlined throat for maintaining a liquid vortex surrounding the arc to constrict and stabilize the same and to control and direct said effluent between the point of such stabilization and said other electrode, the stabilized arc and shielding gas passing down through the center of said liquid vortex, said liquid vortex extending beyond the point of stabilization and becoming a part of said effluent.

5. Process which comprises establishing an arc between a non-consumable inner electrode and another electrode, passing an annular stream of suitable gas along said non-consumable electrode to shield the same and form part of an arc-gas flow, maintaining a liquid vortex surrounding a portion of the arc to stabilize the arc and to control and direct said flow, the stabilized arc and shielding gas passing through the center of said liquid vortex.

6. Apparatus which comprises means for establishing an arc between a non-consumable inner electrode and another electrode, means for passing an annular stream of suitable gas along said non-consumable electrode to shield the same and form part of an arc-gas flow, means for maintaining a liquid vortex surrounding a portion of the arc to stabilize the arc and to control and direct said flow, the stabilized arc and shielding gas passing through the center of said liquid vortex.

7. Apparatus which comprises means for establishing a high-pressure high-current arc between a non-consumable electrode and another electrode, a liquid turbine body surrounding said non-consumable electrode, a gas nozzle having a streamlined interior surrounding said non-consumable electrode and extending down into said liquid turbine body, said liquid turbine body having an annular chamber, a liquid guide tube mounted in said body below said chamber, a streamlined throat leading from said chamber to said liquid guide tube, and means for injecting liquid under pressure tangentially into said chamber for maintaining a liquid vortex surrounding the arc to constrict and stabilize the same.

References Cited in the file of this patent

UNITED STATES PATENTS

| | | |
|---|---|---|
| 1,638,336 | Himes | Aug. 9, 1927 |
| 1,892,325 | Wist | Dec. 27, 1932 |
| 2,522,482 | Olzak | Sept. 12, 1950 |
| 2,686,860 | Buck et al. | Aug. 17, 1954 |
| 2,769,079 | Briggs | Oct. 30, 1956 |

FOREIGN PATENTS

| | | |
|---|---|---|
| K17,808 | Germany | June 15, 1956 |

OTHER REFERENCES

"Zeitschrift für Physik," Bd. 138, S. 170–182 (1954).